(12) United States Patent
Takezawa et al.

(10) Patent No.: US 11,450,852 B2
(45) Date of Patent: Sep. 20, 2022

(54) POSITIVE ELECTRODE FOR SECONDARY BATTERY, AND SECONDARY BATTERY

(71) Applicant: Panasonic Intellectual Property Management Co., Ltd., Osaka (JP)

(72) Inventors: Hideharu Takezawa, Nara (JP); Tomoki Shiozaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 326 days.

(21) Appl. No.: 16/689,387

(22) Filed: Nov. 20, 2019

(65) Prior Publication Data
US 2020/0091515 A1 Mar. 19, 2020

Related U.S. Application Data (63) Continuation of application No. PCT/JP2018/015187, filed on Apr. 11, 2018.

(30) Foreign Application Priority Data

May 31, 2017 (JP) .............................. JP2017-108211

(51) Int. Cl.
*H01M 4/525* (2010.01)
*H01M 4/36* (2006.01)
(Continued)

(52) U.S. Cl.
CPC ........... *H01M 4/525* (2013.01); *H01M 4/366* (2013.01); *H01M 4/485* (2013.01); *H01M 10/0525* (2013.01); *H01M 2004/028* (2013.01)

(58) Field of Classification Search
None
See application file for complete search history.

(56) References Cited

U.S. PATENT DOCUMENTS

2007/0015058 A1  1/2007  Takezawa et al.
2008/0070119 A1  3/2008  Miura et al.
(Continued)

FOREIGN PATENT DOCUMENTS

CN    1897331 A    1/2007
CN  105470451 A    4/2016
(Continued)

OTHER PUBLICATIONS

Translation of International Search Report dated Jul. 17, 2018, issued in counterpart Application No. PCT/JP2018/015187. (2 pages).
(Continued)

*Primary Examiner* — Wyatt P McConnell
(74) *Attorney, Agent, or Firm* — WHDA, LLP (57) ABSTRACT

A positive electrode with a positive electrode current collector and a positive electrode mixture layer, and the positive electrode mixture layer has first and second positive electrode mixture layers. The first positive electrode mixture layer comprises a positive electrode active material composed of compound A that contains Ni, Co, Al and Li. The second positive electrode mixture layer is disposed between the first positive electrode mixture layer and the positive electrode current collector, and comprises a positive electrode active material including: said compound A; and a Li-containing compound B which is smaller in specific capacity (mAh/g) and average particle diameter than said compound A. In said compound A, a ratio of Ni to the total number of moles of the metal elements except Li is 82 mol % or more. The average particle diameter of said compound B is 55% or less of the average particle diameter of said compound A.

12 Claims, 2 Drawing Sheets

(51) Int. Cl.
  *H01M 4/485* (2010.01)
  *H01M 10/0525* (2010.01)
  *H01M 4/02* (2006.01)

(56) References Cited

U.S. PATENT DOCUMENTS

| | | | |
|---|---|---|---|
| 2011/0033750 A1* | 2/2011 | Hosokawa | C01G 53/006 |
| | | | 429/223 |
| 2012/0213920 A1 | 8/2012 | Yanagita et al. | |
| 2013/0309576 A1* | 11/2013 | Ogata | H01M 4/525 |
| | | | 429/231.1 |
| 2016/0093922 A1 | 3/2016 | Endo et al. | |

FOREIGN PATENT DOCUMENTS

| | | | |
|---|---|---|---|
| JP | 2007-48744 A | 2/2007 |
| JP | 2008-98142 A | 4/2008 |
| JP | 2009-176552 A | 8/2009 |
| JP | 2010-55761 A | 3/2010 |
| JP | 2011-192541 A | 9/2011 |
| JP | 2012-174485 A | 9/2012 |
| JP | 2013-033764 A | 2/2013 |
| JP | 2015-15182 A | 1/2015 |

OTHER PUBLICATIONS

English Translation of Search Report dated Feb. 21, 2022, issued in counterpart to CN Application No. 201880029953.7. (3 pages).

* cited by examiner

POSITIVE ELECTRODE FOR SECONDARY BATTERY, AND SECONDARY BATTERY

TECHNICAL FILED

The present invention relates to a positive electrode for a secondary battery, and to a technology of a secondary battery.

BACKGROUND ART

For example, Patent Literature 1 suggests a non-aqueous electrolyte secondary battery, comprising a positive electrode for a lithium secondary battery wherein the positive electrode comprises a collector substrate and a positive electrode applying film composed of a plurality of mixture layers on the collector substrate, and wherein the positive electrode applying film contains two or more lithium-containing compounds having different heat generation starting temperature as positive electrode active materials, at least one lithium-containing compound of the two or more lithium-containing compounds has heat generation starting temperature of 300° C. or more, and the at least one lithium-containing compound having heat generation starting temperature of 300° C. or more is contained in a first mixture layer which is nearest to the collector substrate. According to the non-aqueous electrolyte secondary battery of Patent Literature 1, it is possible to suppress increase in battery temperature when an internal short circuit occurs.

CITATION LIST

Patent Literature

PATENT LITERATURE 1: Japanese Unexamined Patent Application Publication No. 2007-48744

SUMMARY

A Li-containing compound having high Ni content is useful as a positive electrode active material capable of providing high capacity of a secondary battery. On the other hand, a Li-containing compound having high Ni content has low heat stability. Therefore, when an internal short circuit occurs in a secondary battery using a Li-containing compound having high Ni content as a positive electrode active material, increase in battery temperature sometimes could not be suppressed sufficiently in the conventional art.

Therefore, it is an advantage of the present disclosure to provide a positive electrode for a secondary battery capable of suppressing increase in battery temperature when an internal short circuit occurs, even if a Li-containing compound having high Ni content is used as a positive electrode active material, and to provide a secondary battery comprising the positive electrode.

The positive electrode for the secondary battery according to one embodiment of the present disclosure comprises a positive electrode current collector and positive electrode mixture layers, wherein the positive electrode mixture layers have a first positive electrode mixture layer including a positive electrode active material composed of a Ni, Co, Al and Li-containing compound A, and a second positive electrode mixture layer disposed between the first positive electrode mixture layer and the positive electrode current collector and including a positive electrode active material including the compound A and a Li-containing compound B having a lower specific capacity (mAh/g) and a smaller average particle size than the compound A, wherein a Ni content of the compound A is 82 mol % or more based on a total number of moles of metallic elements except for Li, and an average particle size of the compound B is 55% or less of an average particle size of the compound A.

The secondary battery according to one aspect of the present disclosure comprises a positive electrode, a negative electrode, and an electrolyte, wherein the positive electrode is the above-mentioned positive electrode for a secondary battery.

According to one aspect of the present disclosure, even if a Li-containing compound having high Ni content is used as a positive electrode active material, it is possible to suppress increase in battery temperature when an internal short circuit occurs.

DESCRIPTION OF EMBODIMENTS

A Ni, Co, Al and Li-containing compound having a Ni content of 82 mol % or more based on the total number of moles of metallic elements except for Li is useful as a positive electrode active material capable of providing high capacity of a secondary battery. However, such a Li-containing compound having high Ni content is easy to be thermally decomposed by heat generated due to an internal short circuit of a secondary battery, and thus further increase in battery temperature is caused when an internal short circuit occurs. As a result of earnest studies, the present inventors have found that the Li-containing compound having a lower specific capacity than the above-mentioned Li-containing compound having a high Ni content and an average particle size of 55% or less of an average particle size of the above-mentioned Li-containing compound having high Ni content has much higher heat stability than that of the above-mentioned Li-containing compound having high Ni content, and finally conceived of the positive electrode for a secondary battery according to the embodiment described below.

The positive electrode for a secondary battery according to one aspect of the present disclosure comprises a positive electrode current collector and positive electrode mixture layers, wherein the positive electrode mixture layers have a first positive electrode mixture layer including a positive electrode active material composed of a Ni, Co, Al and Li-containing compound A, and a second positive electrode mixture layer disposed between the first positive electrode mixture layer and the positive electrode current collector and including a positive electrode active material including the compound A and a Li-containing compound B having a lower specific capacity (mAh/g) and a smaller average particle size than the compound A, wherein a Ni content of the compound A is 82 mol % or more based on a total number of moles of metallic elements except for Li, and an average particle size of the compound B is 55% or less of an average particle size of the compound A.

According to the above-mentioned positive electrode for a secondary battery, even if a conductive foreign substance etc. having a negative potential reaches the positive electrode current collector and an internal short circuit occurs, thermal decomposition of the Li-containing compound having high Ni content (the above-mentioned compound A) present in the second positive electrode mixture layer is suppressed since a Li-containing compound having very high heat stability (the above-mentioned compound B) is disposed around the Li-containing compound having high Ni content (the above-mentioned compound A) present in the second positive electrode mixture layer. Furthermore, the Li-containing compound having high Ni content (the above-mentioned compound A) present in the first positive electrode mixture layer is prevented from directly contacting with the positive electrode current collector by the second positive electrode mixture layer comprising the Li-containing compound having very high heat stability (the above-mentioned compound B), and thus thermal decomposition of the Li-containing compound having high Ni content (the above-mentioned compound A) present in the first positive electrode mixture layer is also suppressed. Therefore, although the positive electrode for a secondary battery according to one aspect of the present disclosure uses a Li-containing compound having high Ni content as a positive electrode active material, increase in battery temperature when an internal short circuit occurs is suppressed.

Hereinafter, an example of embodiments will be described in detail. Drawings referred to in the description of embodiments are schematically illustrated, and the dimension ratio of the components shown in the drawings may be different from those of actual components.

Figure 1:
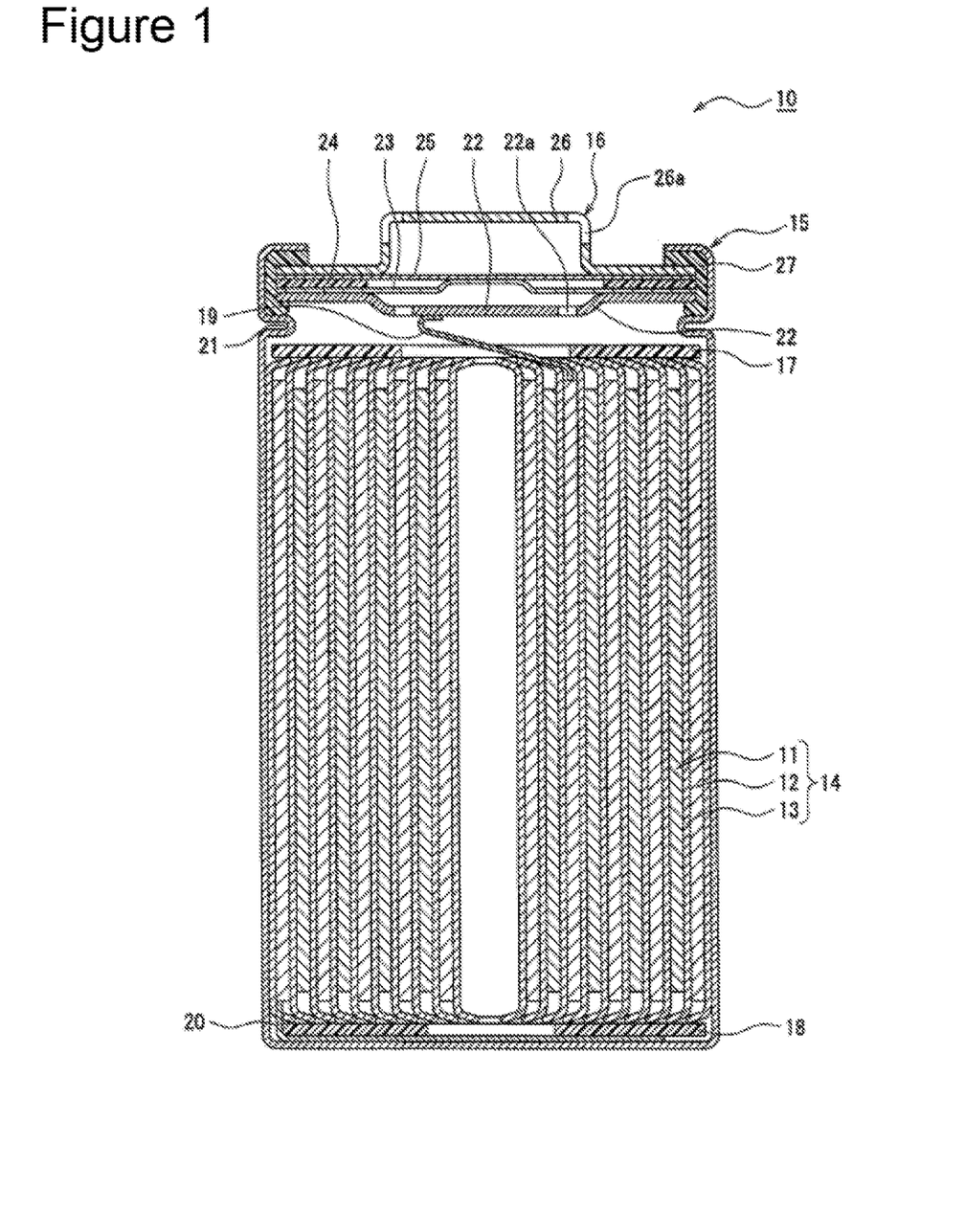
FIG. 1 is a sectional view of the secondary battery as one example of the embodiments.

FIG. 1 is a sectional view of the secondary battery as one example of the embodiments. The secondary battery 10 shown in FIG. 1 comprises a wound type electrode assembly 14 in which a positive electrode 11 and a negative electrode 12 are wound together with a separator 13 therebetween, an electrolyte, insulating plates 17, 18 disposed on the upper side and the lower side, respectively, of the electrode assembly 14, and a battery case for housing the above-mentioned components. The battery case includes a bottomed cylindrical case body 15 and a sealing body 16. Instead of a wound type electrode assembly 14, other forms of electrode assemblies may be applied, for example, laminated-type electrode assembly and the like in which a positive electrode and a negative electrode are alternately laminated with separators interposed therebetween. Examples of the battery case may include cylindrical, rectangular, coin-shaped, button-shaped and other shaped cases made of a metal, and cases made of a resin formed by laminating resin sheets (laminated-type battery).

A case body 15 is, for example, a bottomed cylindrical container made of metal. A gasket 27 is provided between the case body 15 and the sealing body 16 to ensure sealability inside the battery case. The case body 15 preferably has a projection part 21 for supporting the sealing body 16, wherein the projection part 21 is for example formed by pressing a side wall from outside. The projection part 21 is preferably formed annularly along the circumferential direction of the case body 15, and the sealing body 16 is supported on upper surface of the projection part 21.

The sealing body 16 has a filter 22 in which a filter opening part 22a is formed and valve elements disposed on the filter 22. The valve elements cover the filter opening part 22a of the filter 22, and rupture when the internal pressure within the battery increases due to heat generation caused by a short circuit etc. In the present embodiment, a lower valve element 23 and an upper valve element 25 are provided as valve elements. An insulating component 24 disposed between the lower valve element 23 and the upper valve element 25, and a cap 26 having a cap opening part 26a are further provided. Each component constituting the sealing body 16 has for example a disk shape or a ring shape, and each component except for the insulating component 24 is electrically connected each other.

Specifically, the filter 22 and the lower valve element 23 are bonded each other in the peripheral edge parts thereof. The upper valve element 25 and the cap 26 are also bonded each other in the peripheral edge parts thereof. The lower valve element 23 and the upper valve element 25 are connected each other in the center parts thereof, and the insulating component 24 is interposed between the peripheral edge parts of those valve elements.

When the internal pressure increases due to heat generation caused by a short circuit etc., the lower valve element 23, for example, raptures in a thin part, and thus the upper valve element 25 swells toward the cap 26 and is spaced apart from the lower valve element 23 resulting in interruption of electrical connection of both valve elements.

In the secondary battery 10 shown in FIG. 1, a positive electrode lead 19 attached to the positive electrode 11 passes through a through-hole of the insulating plate 17 and extends toward the sealing body 16, and a negative electrode lead 20 attached to the negative electrode 12 passes through the exterior of the insulating plate 18 and extends toward the bottom of the case body 15. For example, the positive electrode lead 19 is connected by welding etc. to the lower surface of the filter 22 which is the bottom plate of the sealing body 16, and the cap 26 which is the top plate of the sealing body 16 connected electrically to the filter 22 serves as a positive electrode terminal. The negative electrode lead 20 is connected by welding etc. to the inner surface of bottom of the case body 15, and thus the case body 15 serves as a negative electrode terminal.

[Positive Electrode]

Figure 2:
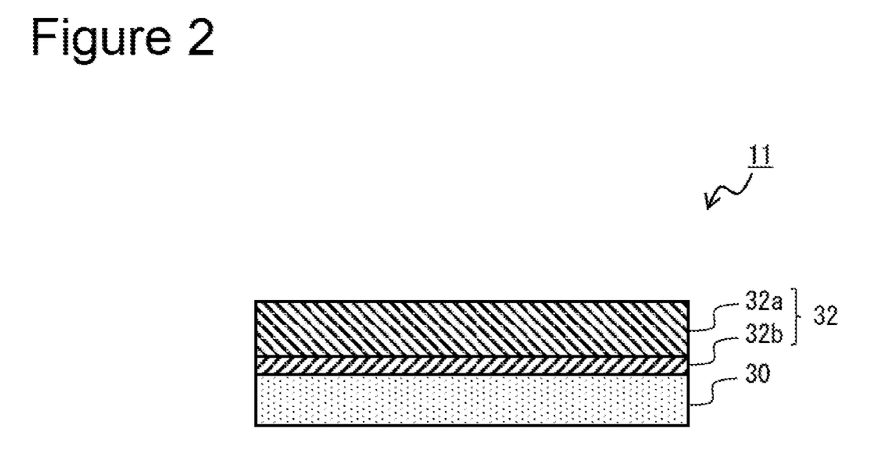
FIG. 2 is a sectional view of the positive electrode as one example of the embodiments.

FIG. 2 is a sectional view of the positive electrode as one example of the embodiments. The positive electrode 11 comprises a positive electrode current collector 30 and a positive electrode mixture layer 32. The positive electrode mixture layer 32 comprises a first positive electrode mixture layer 32a, and a second positive electrode mixture layer 32b provided between the first positive electrode mixture layer 32a and the positive electrode current collector 30.

For the positive electrode current collector 30, metallic foils such as aluminum and aluminum alloy which are stable within the potential range of the positive electrode, and films and the like having such metals disposed on the surface can be used. The positive electrode current collector 30 has a thickness of for example about 10 μm to 100 μm.

The first positive electrode mixture layer 32a constituting the positive electrode mixture layer 32 includes a positive electrode active material composed of a Ni, Co, Al and Li-containing compound A. Furthermore, the first positive electrode mixture layer 32a preferably includes a binding agent in terms of securing of mechanical strength of the first positive electrode mixture layer 32a by binding the positive electrode active materials each other and in terms of ability to enhance biding property between the first positive electrode mixture layer 32a and the second positive electrode mixture layer 32b. Furthermore, the first positive electrode mixture layer 32a preferably includes a conductive agent in terms of ability to enhance conductivity of the layer.

The Ni, Co, Al and Li-containing compound A is not particularly limited as long as the compound contains Ni, Co, Al and Li and has a Ni content of 82 mol % or more based on the total number of moles of metallic elements except for Li. For example, the Ni, Co, Al and Li-containing compound A is expressed by the following general formula:

$$Li_xNi_yCo_\alpha Al_\beta M_\gamma O_{2-z} \qquad (1)$$

wherein, x, y, α, β, γ and z satisfy 0.95<x<1.2, 0.82≤y<1, 0<α≤0.15, 0<β≤0.03, 0≤γ≤0.02, y+α+β+γ=1, and 0≤z<0.05, respectively. In this formula, M is not particularly limited as long as M is at least one element except for Li, Ni, Co, Al, and examples of M include, for example, at least one element selected from Fe, Mg, Ti, Cr, Cu, Ze, Sn, Zr, Nb, Mo, Ta, W, Na, K, Ba, Sr, Bi, Be and B.

The second positive electrode mixture layer 32b constituting the positive electrode mixture layer 32 includes a positive electrode active material including the above-mentioned Ni, Co, Al and Li-containing compound A (hereinafter, may be referred to as compound A) and Li-containing compound B. The second positive electrode mixture layer 32b may include a binding agent and a conductive agent.

The Li-containing compound B is a Li-containing compound having a lower specific capacity than the compound A and a smaller average particle size than the average particle size of the compound A (hereinafter, may be referred to as compound B).

The average particle size of the compound B can be 55% or less of the average particle size of the compound A, and preferably it is in the range of ⅕ to ½, more preferably in the range of ⅓ to ½ in terms of further enhancement of heat stability of the compound B and further suppressing of thermal decomposition of the compound A. Herein, an average particle size means a volume average particle size measured by laser diffraction method, which is a median size at which integrated value of volume is 50% in particle size distribution. The average particle size of the compound A and the compound B can be measured using a laser diffraction/scattering particle size distribution analyzer (manufactured by HORIBA, Ltd.), for example.

The average particle sizes of the compound A and the compound B are not particularly limited as long as they satisfy the above-mentioned relationship, but they are preferably within the range below. The average particle size of the compound A is preferably, for example, in the range of 1 μm to 50 μm, more preferably in the range of 5 μm to 20 μm in terms of heat stability of the compound A or enhancement of battery capacity. The average particle size of the compound B is preferably, for example, in the range of 0.5 μm to 25 μm, more preferably in the range of 2.5 μm to 10 μm in terms of heat stability etc. of the compound B.

The specific capacity of the compound B is not particularly limited as long as it is lower than the specific capacity of the compound A, and the specific capacity of the compound B is preferably in the range of 60% to 98% of the specific capacity of the compound A, more preferably in the range of 70% to 90% of the specific capacity of the compound A in terms of further enhancement of heat stability of the compound B and further suppressing of thermal decomposition of the compound A. The specific capacity of the compound A (specific capacity of the compound B) means electric capacity per g of the compound A (compound B) (mAh/g). Measurement of specific capacity will be described in the section of Examples.

Examples of the compound B may include lithium-containing compounds containing a transition metal element such as Co, Mn or Ni. In terms of heat stability of the compound B, the compound B preferably includes, for example, at least any one of a Ni, Co, Mn and Li-containing compound, a Ni, Co, Al and Li-containing compound having a Ni content of less than 82 mol % based on the total number of moles of metallic elements except for Li, and a compound comprising a core part of a Ni, Co, Al and Li-containing compound and a shell part of a Ni, Co, Mn and Li-containing compound disposed on the surface of the core part.

In terms of heat stability, a Ni, Co, Mn and Li-containing compound is preferably a Ni, Co, Mn and Li-containing compound having a Ni content of less than 82 mol % based on the total number of moles of metallic elements except for Li, and for example expressed by the following general formula:

$$Li_xNi_yCo_\alpha Mn_\beta M_\gamma O_{2-z} \quad (2)$$

wherein, x, y, α, β, γ and z satisfy 0.95<x<1.2, 0.3≤y<0.82, 0<α≤0.4, 0<β≤0.4, 0≤γ≤0.02, y+α+β+γ=1, and 0≤z<0.05, respectively. More preferably y satisfies 0.3≤y≤0.6. In this formula, M is not particularly limited as long as M is at least one element except for Li, Ni, Co, Mn, and examples of M include, for example, at least one element selected from Fe, Mg, Ti, Cr, Cu, Ze, Sn, Zr, Nb, Mo, Ta, W, Na, K, Ba, Sr, Bi, Be and B. When a compound of the above-mentioned general formula (2) is used as a compound B, the average particle size of the compound B is preferably in the range of ⅕ to ½ of the average particle size of the compound A, more preferably in the range of ⅓ to ½.

A Ni, Co, Al and Li-containing compound having a Ni content of less than 82 mol % based on the total number of moles of metallic elements except for Li is for example expressed by the following general formula:

$$Li_xNi_yCo_\alpha Al_\beta M_\gamma O_{2-z} \quad (3)$$

wherein, x, y, α, β, γ and z satisfy 0.95<x<1.2, 0.6≤y<0.82, 0<α≤0.2, 0<β≤0.15, 0≤γ≤0.02, y+α+β+γ=1, and 0≤z<0.05, respectively. In this formula, M is not particularly limited as long as M is at least one element except for Li, Ni, Co, Mn, and examples of M include at least one element selected from Fe, Mg, Ti, Cr, Cu, Ze, Sn, Zr, Nb, Mo, Ta, W, Na, K, Ba, Sr, Bi, Be and B.

Examples of the compound B, in addition to those exemplified above, include $LiCoO_2$, $Li_xCo_yM_{1-y}O_z$, $LiMnO_2$, $LiMn_2O_4$, $Li_xMn_{2-y}M_yO_4$, $LiMPO_4$ and $Li_2MPO_4F$ (M; at least one of Na, Mg, Sc, Y, Fe, Co, Cu, Zn, Al, Cr, Pb, Sb, B, 0<x≤1.2, 0<y≤0.9, 2.0≤z≤2.3). In a compound comprising a core part of Ni, Co, Al and Li-containing compound and a shell part of Ni, Co, Mn and Li-containing compound disposed on the surface of the core part, the Ni, Co, Al and Li-containing compound of the core part is preferably a compound of the above-mentioned general formula (1) or (3), and the Ni, Co, Mn and Li-containing compound of the shell part is preferably a compound of the above-mentioned general formula (2).

The content of the compound B is preferably in the range of 1 mass % to 50 mass % based on the total amount of the positive electrode mixture layer 32, more preferably in the range of 3 mass % to 30 mass %. When the content of the compound B is less than 1 mass %, the amount of the compound B disposed around the compound A in the second positive electrode mixture layer 32b is lower, and thus thermal decomposition of the compound A when an internal short circuit occurs is less suppressed compared to when the content of the compound B satisfies the above range, and higher battery temperature may be caused. When the content of the compound B exceeds 30 mass %, the content of the compound A in the positive electrode mixture layer 32 is lower, and thus battery capacity may be reduced compared to when the content of the compound A satisfies the above range.

The content of the compound A is preferably in the range of 50 mass % to 99 mass % based on the total amount of the positive electrode mixture layer 32, more preferably in the range of 70 mass % to 97 mass %, in terms of suppressing of reduction of battery capacity and increase in battery temperature when an internal short circuit occurs.

The second positive electrode mixture layer 32b preferably includes an insulating inorganic material. Because of an insulating inorganic material included in the second positive electrode mixture layer 32b, it is considered that when a conductive foreign substance etc. having a negative potential reaches the positive electrode current collector 30 and an internal short circuit occurs, the second positive electrode mixture layer 32b serves as a high-resistance component, and thus increase in short-circuit current flowing between the positive and negative electrodes is suppressed, and increase in battery temperature when an internal short circuit occurs is more suppressed.

An insulating inorganic material is preferably, for example, an inorganic material having a resistivity of $10^{12}$ Ωcm or more, and examples thereof include metal oxide particles, metal nitride particles, metal fluoride particles and insulating magnetic particles. Examples of the metal oxide particles include aluminum oxide, titanium oxide, zirconium oxide, silicon oxide, manganese oxide, magnesium oxide and nickel oxide. Examples of the metal nitride particles include boron nitride, aluminum nitride, magnesium nitride and silicon nitride. Examples of the metal fluoride particles include aluminum fluoride, lithium fluoride, sodium fluoride, magnesium fluoride, calcium fluoride and barium fluoride. Examples of the insulating magnetic particles include Ni—Cu—Zn based ferrite. An insulating inorganic material preferably comprises at least any one of aluminum oxide, titanium oxide, silicon oxide, manganese oxide, more preferably comprises at least aluminum oxide, in terms of insulating property, high melting point, and lower oxidizability than the positive electrode active material.

The content of the insulating inorganic material is, for example, preferably in the range of 1 mass % to 20 mass % based on the total amount of the positive electrode mixture layer. When the content of the insulating inorganic material is less than 1 mass %, the effect of suppressing increase in battery temperature when an internal short circuit occurs is small compared to when the above range is satisfied. When the content of the insulating inorganic material is more than 20 mass %, battery capacity may be reduced compared to when the above range is satisfied.

Examples of a conductive agent used for the first positive electrode mixture layer 32a and the second positive electrode mixture layer 32b include carbon-based particles such as carbon black (CB), acetylene black (AB), ketjen black and graphite. These may be used singly or in combinations of two or more.

Examples of a binding agent used for the first positive electrode mixture layer 32a and the second positive electrode mixture layer 32b include fluorine-based resins such as polytetrafluoroethylene (PTFE) and polyvinylidene fluoride (PVdF), polyacrylonitrile (PAN), polyimide-based resins, acrylic resins and polyolefin-based resins. These resins can be used in combination with carboxymethyl cellulose (CMC) or salts thereof (CMC-Na, CMC-K, CMC-$NH_4$ etc., or may be partially neutralized salts), polyethylene oxide (PEO) etc. These may be used singly or in combinations of two or more.

The ratio of the thickness of the first positive electrode mixture layer 32a to the total thickness of the positive electrode mixture layers is preferably 40% to 95%, particularly preferably 50% to 90%. The ratio of the thickness of the second positive electrode mixture layer 32b to the total thickness of the positive electrode mixture layers is preferably 5% to 60%, particularly preferably 10% to 50%.

One example of methods of producing a positive electrode 11 will be described. Firstly, a second positive electrode mixture layer 32b is formed by applying and drying a slurry for the second positive electrode mixture layer including a compound A and a compound B and other components onto a positive electrode current collector 30, and the formed second positive electrode mixture layer 32b is subjected to rolling process. Next, a first positive electrode mixture layer 32a is formed by applying and drying a slurry for the first positive electrode mixture layer including a compound A onto the second positive electrode mixture layer 32b, and the formed first positive electrode mixture layer 32a is subjected to rolling process. Thus, a positive electrode 11 can be obtained.

[Negative Electrode]

A negative electrode 12 comprises a negative electrode current collector such as those made of a metallic foil and a negative electrode mixture layer formed on the negative electrode current collector. For the negative electrode current collector, metallic foils such as copper which are stable within the potential range of the negative electrode, and films and the like having such metals disposed on the surface can be used. The negative electrode mixture layer includes, for example, a negative electrode active material, a binding agent, and a thickener etc.

The negative electrode 12 is obtained by, for example, applying and drying a negative electrode mixture slurry including a negative electrode active material, a thickener and a binding agent onto the negative electrode current collector to form a negative electrode mixture layer on the negative electrode current collector, and subjecting the negative electrode mixture layer to rolling process. The negative electrode mixture layers may be provided on both sides of the negative electrode current collector.

The negative electrode active material is not particularly limited as long as it is a material capable of occluding and releasing lithium ion, and examples thereof include metallic lithium, lithium alloys such as lithium-aluminum alloy, lithium-lead alloy, lithium-silicon alloy and lithium-tin alloy, carbon material such as graphite, coke and baked organic substance and metal oxides such as $SnO_2$, SnO and $TiO_2$. These may be used singly or in combinations of two or more.

As a binding agent included in the negative electrode mixture layer, a fluorine-based resin, PAN, a polyimide-based resin, an acrylic resin, a polyolefin-based resin, etc. can be used, as is the case with the positive electrode. In the case of preparing a negative electrode mixture slurry using an aqueous solvent, it is preferable to use styrene-butadiene rubber (SBR), CMC or salts thereof, polyacrylic acid (PAA) or salts thereof (PAA-Na, PAA-K etc., or may be partially neutralized salts), polyvinyl alcohol (PVA) etc.

[Separator]

Foe a separator 13, for example, a porous sheet having ion permeability and insulating property is used. Specific examples of a porous sheet include fine porous thin films, woven fabrics and non-woven fabrics. As a material of the separator, olefin-based resins such as polyethylene and polypropylene, celluloses, etc. are suitable. The separator 13 may be a laminated product having a cellulose fiber layer and a thermoplastic resin fiber layer such as those made of an olefin-based resin etc. The separator may be a multilayer separator including a polyethylene layer and a polypropylene layer, or a separator having a material such as an aramid-based resin and a ceramic applied on the surface can be used.

[Electrolyte]

An electrolyte includes a solvent and an electrolyte salt dissolved in the solvent. An electrolyte is not limited to a liquid electrolyte (non-aqueous electrolytic solution), but may be a solid electrolyte using a gel polymer etc. As a solvent, for example, non-aqueous solvent such as esters, ethers, nitriles such as acetonitrile, amides such as dimethylformamide, and a mixed solvent of two or more of such solvents, and water can be used. A non-aqueous solvent may contain a halogen-substituted compound in which at least a part of hydrogen atoms of these solvents has been substituted with halogen atoms such as fluorine.

Examples of the above esters include cyclic carbonate esters such as ethylene carbonate (EC), propylene carbonate (PC) and butylene carbonate, chain carbonate esters such as dimethyl carbonate (DMC), methylethyl carbonate (EMC), diethyl carbonate (DEC), methylpropyl carbonate, ethylpropyl carbonate and methyl isopropyl carbonate, cyclic carboxylate esters such as γ-butyrolactone and γ-valerolactone, chain carboxylate esters such as methyl acetate, ethyl acetate, propyl acetate, methyl propionate (MP), ethyl propionate and γ-butyrolactone.

Examples of the above ethers include cyclic ethers such as 1,3-dioxolane, 4-methyl-1,3-dioxolane, tetrahydrofuran, 2-methyl tetrahydrofuran, propylene oxide, 1,2-butylene oxide, 1,3-dioxane, 1,4-dioxane, 1,3,5-trioxane, furan, 2-methyl furan, 1,8-cineol and crown ether, chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl.

As an above halogen-substituted compound, fluorinated cyclic carbonate esters such as fluoroethylene carbonate (FEC), fluorinated chain carboxylate esters such as fluorinated chain carbonate ester and methyl fluoropropionate (FMP) are preferably used.

An electrolyte salt is preferably a lithium salt. Examples of a lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(CnF_{2n+1})_x$ (where $1<x<6$, and n is 1 or 2), $LiB_{10}Cl_{10}$, LiCl, LiBr, LiI, chloroborane lithium, lithium short-chain aliphatic carboxylates, borate salts such as $Li_2B_4O_7$ and $Li(B(C_2O_4)_2)$, imide salts such as $LiN(SO_2CF_3)_2$ and $LiN(C_lF_{2l+1}SO_2)(C_mF_{2m+1}SO_2)$ {where l and m are integers of 1 or more}. These lithium salts may be used singly or as a mixture of two or more thereof. Among these, it is preferable to use $LiPF_6$ in terms of ion conductivity and electrochemical stability. The concentration of the lithium salt is preferably 0.8 to 1.8 mol per L of solvent.

EXAMPLES

Hereinafter, the present disclosure will be further described in more details by way of Examples, but is not limited to the following Examples.

Example 1

[Production of Positive Electrode]

A mixture obtained by mixing $LiNi_{0.88}Co_{0.09}Al_{0.03}O_2$ (hereinafter, referred to as NCA88) having an average particle size of 8.5 μm and $LiNi_{0.35}Co_{0.35}Mn_{0.30}O_2$ (hereinafter, referred to as NCM35) having an average particle size of 4.2 μm (mass ratio 7:3), acetylene black (AB), and poly (vinylidene fluoride) (PVDF) were mixed in a mass ratio of 98:1:1, and a suitable amount of N-methyl-2-pyrrolidone (NMP) was further added to the resulting mixture to prepare a slurry for a second positive electrode mixture layer. Then, the resulting slurry was applied to both sides of a positive electrode current collector having a thickness of 15 μm and composed of aluminum foil, and the applying films were dried to form the second positive electrode mixture layers.

Next, NCA88, acetylene black (AB), and poly (vinylidene fluoride) (PVDF) were mixed in a mass ratio of 98:1:1, and a suitable amount of N-methyl-2-pyrrolidone (NMP) was further added to the resulting mixture to prepare a slurry for a first positive electrode mixture layer. Then, this slurry for the first positive electrode mixture layer was applied to the second positive electrode mixture layers formed on both sides of the positive electrode current collector, and the applying films were dried to form the first positive electrode mixture layers. The positive electrode mixture layers formed on the positive electrode current collector were rolled by a rolling mill. The resulting ratio of the thickness of the first positive electrode mixture layer to the thickness of the second positive electrode mixture layer was 50:50. The resulting electrode was used as the positive electrode of Example 1.

The average particle size of NCM35 was 55% or less of the average particle size of NCA88, and the content of NCM35 was 14.7 mass % based on the total amount of the positive electrode mixture layers (first positive electrode mixture layer+second positive electrode mixture layer).

[Production of Negative Electrode]

100 parts by mass of Artificial graphite, 1 part by mass of carboxymethyl cellulose (CMC), and 1 part by mass of styrene-butadiene rubber (SBR) were mixed to prepare a negative electrode mixture slurry. Then, the resulting negative electrode mixture slurry was applied to both sides of a negative electrode current collector composed of copper foil. After drying the applying films, the applying films were rolled using a rolling mill to produce a negative electrode having negative electrode mixture layers formed on both sides of the negative electrode current collector.

[Preparation of Electrolyte]

Ethylene carbonate (EC), methylethyl carbonate (EMC), and dimethyl carbonate (DMC) were mixed in a volume ratio of 3:3:4. $LiPF_6$ was dissolved in the resulting mixed solvent so as to obtain concentration of 1.2 mol/L to prepare a non-aqueous electrolyte.

[Production of Secondary Battery]

The above positive electrode and the negative electrode were each cut into specified size and electrode tabs were attached to them. Then the positive electrode and the negative electrode were wound together with a separator therebetween, and a wound type electrode assembly was thereby produced. Then, the electrode assembly was housed in an aluminum laminate film, the above non-aqueous electrolyte was injected thereinto, and the film was sealed. Thus, the non-aqueous electrolyte secondary battery of Example 1 was obtained.

[Measurement of Specific Capacity]

NCA88 and NCM35 were each produced as a working electrode in the same way as for the positive electrode, and lithium metal was used for a counter electrode to produce a coin type cell. A liquid electrolyte and a separator which were the same as those of the non-aqueous electrolyte secondary battery were used. After the coin type cell was charged at a constant current until the voltage reached 4.3 V at 0.1 mAh/cm², the cell was discharged at a constant current until the voltage reached 2.5 V at 0.1 mAh/cm². The specific capacity (mAh/g) of NCA88 and the specific capacity (mAh/ g) of NCM35 were obtained from the discharge capacity (mAh) of the coin type cell during discharging. As a result, the specific capacity of NCA88 was 192 mAh/g, and the specific capacity of NCM35 was 156 mAh/g.

Example 2

A positive electrode was produced in the same way as in Example 1 except that a mixture obtained by mixing NCA88 and NCM35 (mass ratio 1:1), acetylene black (AB), and poly (vinylidene fluoride) (PVDF) were mixed in a mass ratio of 98:1:1 in preparation of a slurry for the second positive electrode mixture layer. The ratio of the thickness of the first positive electrode mixture layer to the thickness of the second positive electrode mixture layer was 50:50. The content of NCM35 in Example 2 was 24.5 mass % based on the total amount of the positive electrode mixture layers (first positive electrode mixture layer+second positive electrode mixture layer). A non-aqueous electrolyte secondary battery was produced in the same way as in Example 1 using the thus obtained positive electrode as a positive electrode of Example 2.

Example 3

A positive electrode was produced in the same way as in Example 1 except that a mixture obtained by mixing NCA88 and NCM35 (mass ratio 1:1), acetylene black (AB), and poly (vinylidene fluoride) (PVDF) were mixed in a mass ratio of 98:1:1 in preparation of a slurry for the second positive electrode mixture layer. The ratio of the thickness of the first positive electrode mixture layer to the thickness of the second positive electrode mixture layer was 70:30. The content of NCM35 in Example 3 was 14.7 mass % based on the total amount of the positive electrode mixture layers (first positive electrode mixture layer+second positive electrode mixture layer). A non-aqueous electrolyte secondary battery was produced in the same way as in Example 1 using the thus obtained positive electrode as a positive electrode of Example 3.

Example 4

A positive electrode was produced in the same way as in Example 1 except that a mixture obtained by mixing NCA88 and NCM35 (mass ratio 7:3), acetylene black (AB), poly (vinylidene fluoride) (PVDF) and $Al_2O_3$ as an insulating inorganic material were mixed in a mass ratio of 88:1:1:10 in preparation of a slurry for the second positive electrode mixture layer. The ratio of the thickness of the first positive electrode mixture layer to the thickness of the second positive electrode mixture layer was 70:30. The content of NCM35 in Example 4 was 7.9 mass % based on the total amount of the positive electrode mixture layers (first positive electrode mixture layer+second positive electrode mixture layer). The content of $Al_2O_3$ in Example 4 was 3 mass % based on the total amount of the positive electrode mixture layers. A non-aqueous electrolyte secondary battery was produced in the same way as in Example 1 using the thus obtained positive electrode as a positive electrode of Example 4.

Example 5

A positive electrode was produced in the same way as in Example 4 except that a mixture obtained by mixing NCA88 and NCM35 (mass ratio 5:5), acetylene black (AB), poly (vinylidene fluoride) (PVDF) and $Al_2O_3$ as an insulating inorganic material were mixed in a mass ratio of 78:1:1:20 in preparation of a slurry for the second positive electrode mixture layer. The ratio of the thickness of the first positive electrode mixture layer to the thickness of the second positive electrode mixture layer was 70:30. The content of NCM35 in Example 5 was 11.7 mass % based on the total amount of the positive electrode mixture layers (first positive electrode mixture layer+second positive electrode mixture layer). The content of $Al_2O_3$ in Example 5 was 6 mass % based on the total amount of the positive electrode mixture layers. A non-aqueous electrolyte secondary battery was produced in the same way as in Example 1 using the thus obtained positive electrode as a positive electrode of Example 5.

Example 6

A positive electrode was produced in the same way as in Example 4 except that a mixture obtained by mixing NCA88 and NCM35 (mass ratio 5:5), acetylene black (AB), poly (vinylidene fluoride) (PVDF) and $Al_2O_3$ as an insulating inorganic material were mixed in a mass ratio of 78:1:1:20 in preparation of a slurry for the second positive electrode mixture layer. The ratio of the thickness of the first positive electrode mixture layer to the thickness of the second positive electrode mixture layer was 90:10. The content of NCM35 in Example 6 was 3.9 mass % based on the total amount of the positive electrode mixture layers (first positive electrode mixture layer+second positive electrode mixture layer). The content of $Al_2O_3$ in Example 6 was 2 mass % based on the total amount of the positive electrode mixture layers. A non-aqueous electrolyte secondary battery was produced in the same way as in Example 1 using the thus obtained positive electrode as a positive electrode of Example 6.

Example 7

A positive electrode was produced in the same way as in Example 2 except that $LiNi_{0.55}Co_{0.20}Mn_{0.25}O_2$ (hereinafter, referred to as NCM55) having an average particle size of 4.0 µm was used as a compound B of the second positive electrode mixture layer. The ratio of the thickness of the first positive electrode mixture layer to the thickness of the second positive electrode mixture layer was 50:50. The content of NCM55 in Example 7 was 24.5 mass % based on the total amount of the positive electrode mixture layers (first positive electrode mixture layer+second positive electrode mixture layer). A non-aqueous electrolyte secondary battery was produced in the same way as in Example 1 using the thus obtained positive electrode as a positive electrode of Example 7.

Example 8

A positive electrode was produced in the same way as in Example 2 except that $LiNi_{0.55}Co_{0.20}Mn_{0.25}O_2$ (hereinafter, referred to as NCA91) having an average particle size of 9.5 µm was used as a compound A and that $LiNi_{0.55}Co_{0.20}Mn_{0.25}O_2$ (hereinafter, referred to as NCM55) having an average particle size of 4.0 µm was used as a compound B of the second positive electrode mixture layer. The ratio of the thickness of the first positive electrode mixture layer to the thickness of the second positive electrode mixture layer was 50:50. The content of NCM55 in Example 8 was 24.5 mass % based on the total amount of the positive electrode mixture layers (first positive electrode mixture layer+second positive electrode mixture layer). A non-aqueous electrolyte secondary battery was produced in the same way as in Example 1 using the thus obtained positive electrode as a positive electrode of Example 8. The specific capacity of NCA91 was 195 mAh/g, and the specific capacity of NCM55 was 160 mAh/g.

Example 9

A positive electrode was produced in the same way as in Example 8 except that the ratio of the thickness of the first positive electrode mixture layer to the thickness of the second positive electrode mixture layer was 70:30. The content of NCM55 in Example 9 was 14.7 mass % based on the total amount of the positive electrode mixture layers (first positive electrode mixture layer+second positive electrode mixture layer). A non-aqueous electrolyte secondary battery was produced in the same way as in Example 1 using the thus obtained positive electrode as a positive electrode of Example 9.

Example 10

A positive electrode was produced in the same way as in Example 2 except that NCA88 having an average particle size of 8.5 μm was used as a compound A and that $LiNi_{0.76}Co_{0.14}Mn_{0.10}O_2$ (hereinafter, referred to as NCA76) having an average particle size of 4.0 μm was used as a compound B of the second positive electrode mixture layer. The ratio of the thickness of the first positive electrode mixture layer to the thickness of the second positive electrode mixture layer was 50:50. The content of NCA76 in Example 10 was 24.5 mass % based on the total amount of the positive electrode mixture layers (first positive electrode mixture layer+second positive electrode mixture layer). A non-aqueous electrolyte secondary battery was produced in the same way as in Example 1 using the thus obtained positive electrode as a positive electrode of Example 10. The specific capacity of NCA76 was 171 mAh/g.

Example 11

A positive electrode was produced in the same way as in Example 2 except that NCA91 having an average particle size of 9.5 μm was used as a compound A and that NCA76 having an average particle size of 4.0 μm was used as a compound B of the second positive electrode mixture layer. The ratio of the thickness of the first positive electrode mixture layer to the thickness of the second positive electrode mixture layer was 50:50. The content of NCA76 in Example 11 was 24.5 mass % based on the total amount of the positive electrode mixture layers (first positive electrode mixture layer+second positive electrode mixture layer). A non-aqueous electrolyte secondary battery was produced in the same way as in Example 1 using the thus obtained positive electrode as a positive electrode of Example 11.

Comparative Example 1

A positive electrode was produced in the same way as in Example 1 except that a mixture obtained by mixing the above NCA88 and NCM35 having an average particle size of 10.8 μm (mass ratio 1:1), acetylene black (AB), and poly(vinylidene fluoride) (PVDF) were mixed in a mass ratio of 98:1:1 in preparation of a slurry for the second positive electrode mixture layer. The content of NCM35 in Comparative Example 1 was 24.5 mass % based on the total amount of the positive electrode mixture layers (first positive electrode mixture layer+second positive electrode mixture layer). A non-aqueous electrolyte secondary battery was produced in the same way as in Example 1 using the thus obtained positive electrode as a positive electrode of Comparative Example 1.

The average particle size of NCM35 was 1.2 times or more of the average particle size of NCA88. The specific capacity of NCA88 was similar to that of Example 1, and the specific capacity of NCM35 was 155 (mAh/g).

Comparative Example 2

A positive electrode was produced in the same way as in Example 1, except that the first positive electrode mixture layer including NCA88 was formed on the positive electrode current collector without forming the second positive electrode mixture layer on the positive electrode current collector.

Comparative Example 3

A positive electrode was produced in the same way as in Example 1, except that the first positive electrode mixture layer including NCA91 was formed on the positive electrode current collector without forming the second positive electrode mixture layer on the positive electrode current collector.

[Nail Penetration Test]

For the non-aqueous electrolyte secondary battery of each Example and Comparative Example, nail penetration tests were conducted according to the following procedures.

(1) The battery was charged at a constant current of 600 mA until the battery voltage reached 4.2 V under an environment of 25° C., then charging was continued until the current value reached 150 mA at a constant voltage.

(2) Under an environment of 25° C., the tip of a wire nail having a diameter of 2.7 mmϕ was brought into contact with the center part of the side surface of the battery charged in (1), and the battery was penetrated with the wire nail in the direction of lamination of the electrode assembly in the battery at a speed of 1 mm/s. Immediately after voltage drop of the battery due to an internal short circuit was detected, penetration of the wire nail was stopped.

(3) The temperature of the battery surface was measured 1 minute after a short circuit started to occur in the battery due to the wire nail.

[Measurement of Battery Capacity]

The non-aqueous electrolyte secondary batteries of Examples and Comparative Examples were charged at a constant current of 600 mA until the battery voltage reached 4.2 V under an environment of 25° C. Then charging was conducted at a constant voltage of 4.2 V until the current value reached 150 mA. After an interval of 10 minutes, discharging was conducted at a constant current of 600 mA until the voltage reached 3.0 V, and discharge capacities of batteries of Examples and Comparative Examples were measured.

The result of nail penetration test and the ratio of discharge capacity for each Example and Comparative Example was shown in Table 1 and Table 2. The ratios of discharge capacity are relative values of discharge capacity of Examples and Comparative Example 2 based on the discharge capacity of Comparative Example 1 (100).

TABLE 1

| | First positive electrode mixture layer Compound A (Average particle size) | Second positive electrode mixture layer | | | | | Battery temperature when internal short circuit occurs | Ratio of capacity |
|---|---|---|---|---|---|---|---|---|
| | | Compound A (Average particle size) | Compound B (Average particle size) | Ratio of first/second positive Electrode mixture layers | Ratio of compound B based on sum of compound A and compound B | Content of compound B based on the total amount of positive electrode mixture layers | Content of $Al_2O_3$ based on entire positive electrode mixture layers | | |
| Example 1 | NCA88 (8.5 μm) | NCA88 (8.5 μm) | NCM35 (4.2 μm) | 50/50 | 30 mass % | 14.7 mass % | — | 35° C. | 102 |
| Example 2 | NCA88 (8.5 μm) | NCA88 (8.5 μm) | NCM35 (4.2 μm) | 50/50 | 50 mass % | 24.5 mass % | — | 34° C. | 100 |
| Example 3 | NCA88 (8.5 μm) | NCA88 (8.5 μm) | NCM35 (4.2 μm) | 70/30 | 50 mass % | 14.7 mass % | — | 34° C. | 103 |
| Example 4 | NCA88 (8.5 μm) | NCA88 (8.5 μm) | NCM35 (4.2 μm) | 70/30 | 30 mass % | 7.9 mass % | 3 mass % | 31° C. | 101 |
| Example 5 | NCA88 (8.5 μm) | NCA88 (8.5 μm) | NCM35 (4.2 μm) | 70/30 | 50 mass % | 11.7 mass % | 6 mass % | 30° C. | 101 |
| Example 6 | NCA88 (8.5 μm) | NCA88 (8.5 μm) | NCM35 (4.2 μm) | 90/10 | 50 mass % | 3.9 mass % | 2 mass % | 31° C. | 104 |
| Example 7 | NCA88 (8.5 μm) | NCA88 (8.5 μm) | NCM55 (4 μm) | 50/50 | 50 mass % | 24.5 mass % | — | 35° C. | 102 |
| Example 8 | NCA91 (9.5 μm) | NCA91 (9.5 μm) | NCM35 (4.2 μm) | 50/50 | 50 mass % | 24.5 mass % | — | 35° C. | 104 |
| Example 9 | NCA91 (9.5 μm) | NCA91 (9.5 μm) | NCM35 (4.2 μm) | 70/30 | 50 mass % | 14.7 mass % | — | 36° C. | 105 |
| Example 10 | NCA88 (8.5 μm) | NCA88 (8.5 μm) | NCM76 (4.5 μm) | 50/50 | 50 mass % | 24.5 mass % | — | 36° C. | 104 |

TABLE 2

| | First positive electrode mixture layer Compound A (Average particle size) | Second positive electrode mixture layer | | | | | Battery temperature when internal short circuit occurs | Ratio of capacity |
|---|---|---|---|---|---|---|---|---|
| | | Compound A (Average particle size) | Compound B (Average particle size) | Ratio of first/second positive electrode mixture layers | Ratio of compound B based on sum of compound A and compound B | Content of compound B based on the total amount of positive electrode mixture layers | Content of $Al_2O_3$ based on entire positive electrode mixture layers | | |
| Example 11 | NCA91 (9.5 μm) | NCA91 (9.5 μm) | NCM76 (4.5 μm) | 50/50 | 50 mass % | 24.5 mass % | — | 36° C. | 106 |
| Comparative Example 1 | NCA88 (8.5 μm) | NCA88 (8.5 μm) | NCM35 (10.8 μm) | | 50 mass % | 24.5 mass % | — | 58° C. | 100 |
| Comparative Example 2 | NCA88 (8.5 μm) | — | — | | — | — | — | 120° C. | 105 |
| Comparative Example 3 | NCA91 (9.5 μm) | | | | | | | 120° C. | 107 |

The non-aqueous electrolyte secondary battery of each Example exhibited lower battery temperature than the non-aqueous electrolyte secondary battery of Comparative Example 1 in nail penetration test. Accordingly, even if compound A (NCA88) having high Ni content is used as a positive electrode active material, when Li-containing compound B (NCM35, NCM55, or NCA76) having a lower specific capacity than the above-mentioned compound A and an average particle size of 55% or less of the average particle size of the above-mentioned compound A is included in the second positive electrode mixture layer disposed between the positive electrode current collector and the first positive electrode mixture layer, increase in battery temperature when an internal short circuit occurs is suppressed. Among Examples, increase in battery temperature when an internal short circuit occurs can be more suppressed in Examples 3, 4 and 5 in which $Al_2O_3$ is included in the second positive electrode mixture layer. Also even if compound A (NCA91) having further higher Ni content is used as a positive electrode active material, when Li-containing compound B (NCM35 or NCA76) having a lower specific capacity than the above-mentioned compound A and an average particle size of 55% or less of the average particle size of the above-mentioned compound A is included in the second positive electrode mixture layer disposed between the positive electrode current collector and the first positive electrode mixture layer, increase in battery temperature when an internal short circuit occurs is suppressed.

REFERENCE SIGNS LIST 10 secondary battery
11 positive electrode
12 negative electrode
13 separator
14 electrode assembly 15 case body
16 sealing body
17, 18 insulating plate
19 positive electrode lead
20 negative electrode lead
21 projection part
22 filter
22a filter opening part
23 lower valve element
24 insulating component
25 upper valve element
26 cap
26a cap opening part
27 gasket
30 positive electrode current collector
31 intermediate layer
32 positive electrode mixture layer
32a first positive electrode mixture layer
32b second positive electrode mixture layer

The invention claimed is:

1. A positive electrode for a secondary battery, comprising:
    a positive electrode current collector; and
    positive electrode mixture layers, wherein
    the positive electrode mixture layers have a first positive electrode mixture layer including a positive electrode active material composed of a Ni, Co, Al and Li-containing compound A, and a second positive electrode mixture layer disposed between the first positive electrode mixture layer and the positive electrode current collector and including a positive electrode active material including the compound A and a Li-containing compound B having a lower specific capacity (mAh/g) and a smaller average particle size than the compound A,
    a Ni content of the compound A is 82 mol % or more based on a total number of moles of metallic elements except for Li, and
    an average particle size of the compound B is 55% or less of an average particle size of the compound A,
    wherein the compound B includes at least any one of a Ni, Co, Mn and Li-containing compound and a Ni, Co, Al and Li-containing compound having a Ni content of less than 82 mol % based on the total number of moles of metallic elements except for Li.

2. The positive electrode for a secondary battery according to claim 1, wherein a content of the compound B is in the range of 1 mass % to 50 mass % based on a total amount of the positive electrode mixture layers.

3. The positive electrode for a secondary battery according to claim 1, wherein the specific capacity of the compound B is in the range of 60% to 98% of a specific capacity of the compound A.

4. The positive electrode for a secondary battery according to claim 1, wherein the second positive electrode mixture layer includes an insulating inorganic material.

5. The positive electrode for a secondary battery according to claim 1, wherein a ratio of a thickness of the first positive electrode mixture layer to a total thickness of the positive electrode mixture layers is 40% to 95%, and a ratio of a thickness of the second positive electrode mixture layer to the total thickness of the positive electrode mixture layers is 5% to 60%.

6. A secondary battery comprising:
    the positive electrode according to claim 1;
    a negative electrode; and
    an electrolyte.

7. The positive electrode for a secondary battery according to claim 1,
    wherein the Ni, Co, Al and Li-containing compound A is expressed by the following general formula:

$$Li_xNi_yCo_\alpha Al_\beta M_\gamma O_{2-z} \quad (1)$$

wherein, x, y, $\alpha$, $\beta$, $\gamma$ and z satisfy $0.95<x<1.2$, $0.82 \le y<1$, $0<\alpha \le 0.15$, $0<\beta \le 0.03$, $0 \le \gamma \le 0.02$, $y+\alpha+\beta+\gamma=1$, and $0 \le z<0.05$, respectively and M is at least one element except for Li, Ni, Co, Al.

8. The positive electrode for a secondary battery according to claim 7,
    wherein M is at least one element selected from Fe, Mg, Ti, Cr, Cu, Ze, Sn, Zr, Nb, Mo, Ta, W, Na, K, Ba, Sr, Bi, Be and B.

9. The positive electrode for a secondary battery according to claim 1,
    wherein the Li-containing compound B is expressed by the following general formula:

$$Li_xNi_yCo_\alpha Mn_\beta M_\gamma O_{2-z} \quad (2)$$

wherein, x, y, $\alpha$, $\beta$, $\gamma$ and z satisfy $0.95<x<1.2$, $0.3 \le y<0.82$, $0<\alpha \le 0.4$, $0<\beta \le 0.4$, $0 \le \gamma \le 0.02$, $y+\alpha+\beta+\gamma=1$, and $0 \le z<0.05$, respectively and M is at least one element except for Li, Ni, Co, Mn.

10. The positive electrode for a secondary battery according to claim 9,
    wherein M is at least one element selected from Fe, Mg, Ti, Cr, Cu, Ze, Sn, Zr, Nb, Mo, Ta, W, Na, K, Ba, Sr, Bi, Be and B.

11. The positive electrode for a secondary battery according to claim 9,
    wherein the average particle size of the compound B is in a range of 1/5 to 1/2 of the average particle size of the compound A.

12. The positive electrode for a secondary battery according to claim 1,
    wherein the positive electrode active material of the second positive electrode mixture layer including the compound A and the Li-containing compound B is configured so that the compound A is a core part and the Li-containing compound B is a shell part disposed on a surface of the core part.

* * * * *